US008019862B2

(12) United States Patent
Douceur et al.

(10) Patent No.: US 8,019,862 B2
(45) Date of Patent: Sep. 13, 2011

(54) COLLABORATIVE SPEED DETERMINATION IN DISTRIBUTED SYSTEMS

(75) Inventors: John R. Douceur, Bellevue, WA (US); James W. Mickens, Bellevue, WA (US); Thomas Moscibroda, Redmond, WA (US); Debmalya Panigrahi, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 126 days.

(21) Appl. No.: 12/405,246

(22) Filed: Mar. 17, 2009

(65) Prior Publication Data

US 2010/0241742 A1 Sep. 23, 2010

(51) Int. Cl.
*G06F 15/16* (2006.01)
(52) U.S. Cl. ........................ 709/224; 709/232
(58) Field of Classification Search .................. 709/219, 709/223, 224, 238, 242
See application file for complete search history.

(56) References Cited

U.S. PATENT DOCUMENTS

| | | | |
|---|---|---|---|
| 5,894,556 | A | 4/1999 | Grimm et al. |
| 7,133,368 | B2 | 11/2006 | Zhang et al. |
| 7,194,002 | B2 | 3/2007 | Zhang et al. |
| 7,418,454 | B2 | 8/2008 | Chen et al. |
| 2007/0280255 | A1 | 12/2007 | Tsang et al. |
| 2008/0133767 | A1 | 6/2008 | Birrer et al. |

OTHER PUBLICATIONS

"Average U.S. Upload Speed: 43kbps," posted on <http://www.dslreports.com/shownews/Average-US-Upload-Speed-435kbps-96949> on Aug. 13, 2008.*

Lakshminarayanan, et al."Some Findings on the Network Performance of Broadband Hosts", Retrieved at<<http://www.imconf.net/imc-2003/papers/p301-lakshminarayanan1.pdf>>, IMC'03, Oct. 27-29, 2003, Miami Beach, Florida, USA, pp. 6.

Pang, et al."Scaling Peer-to-Peer Games in Low-Bandwidth Environments", Retrieved at<<http://research.microsoft.com/en-us/um/redmond/events/iptps2007/papers/panguyedalorch.pdf>>, pp. 6.

Ng, et al."Measurement-Based Optimization Techniques for Bandwidth-Demanding Peer-to-Peer Systems", Retrieved at<<http://www.ieee-infocom.org/2003/papers/53_04.PDF>>, IEEE Infocom 2003, pp. 11.

Li, et al."UTAPS: An Underlying Topology-aware Peer Selection Algorithm in BitTorrent", Retrieved at<<http://ieeexplore.ieee.org/stamp/stamp.jsp?arnumber=04482753>>, 22nd International Conference on Advanced Information Networking and Applications, 2008 IEEE, pp. 539-545.

Bharambe, et al."Donnybrook: Enabling Large-Scale, High-Speed, Peer-to-Peer Games", Retrieved at<<http://www.cs.princeton.edu/courses/archive/fall08/cos597B/papers/donnybrook.pdf>>, SIGCOMM'08, Aug. 17-22, 2008, Seattle, Washington, USA, pp. 12.

(Continued)

*Primary Examiner* — William C Vaughn, Jr.
*Assistant Examiner* — Scott Christensen (57) ABSTRACT

The described implementations relate to collaborative speed determination in distributed systems. One method estimates upload speeds of a plurality of hosts. The method sends a first bandwidth probe from a first host to a second host. The method receives, at the first host, a second bandwidth probe sent from the second host. The method determines which of the first and second bandwidth probes was relatively slower. The method designates either of the first or second hosts that sent the relatively slower bandwidth probe as a loser and takes a speed of the bandwidth probe of the loser as a first estimate of the loser's upload speed.

20 Claims, 8 Drawing Sheets

METHOD 800

OTHER PUBLICATIONS

Biskupski, et al. "High-Bandwidth Mesh-based Overlay Multicast in Heterogeneous Environments", Retrieved at<<http://www.cs.tcd.ie/publications/tech-reports/reports.07/TCD-CS-2007-02.pdf>>, AAA-Idea '06, Oct. 10, 2006, Pisa, Italy, pp. 7.

Bozdog, et al. "Selectcast—A Scalable and Self-Repairing Multicast Overlay Routing Facility", Retrieved at<<http://citeseerx.ist.psu.edu/viewdoc/download;jsessionid=E4D72C5433CD8128FB492A4604B698E4?doi=10.1.1.4.7872&rep=rep1&type=pdf>>, GeorgeW. Johnson Center, GeorgeMason University '03, Fairfax, VA, pp. 10.

."Broadband Reports Speed Test Statistics", Retrieved at<<http://www.dslreports.com/archive>>, Jan. 12, 2009, pp. 8.

Carter, et al. "Measuring Bottleneck Link Speed in Packet-Switched Networks", Retrieved at<<http://citeseerx.ist.psu.edu/viewdoc/download?doi=10.1.1.30.156&rep=rep1&type=pdf>>, pp. 1-24.

Dischinger, et al. "SatelliteLab: Adding Heterogeneity to Planetary-Scale Network Testbeds", Retrieved at<<http://research.microsoft.com/en-us/um/people/ssaroiu/publications/sigcomm/2008/satellitelab.pdf>>, SIGCOMM'08, Aug. 17-22, 2008, Seattle, Washington, USA, pp. 12.

Dovrolis, et al. "Packet-Dispersion Techniques and a Capacity-Estimation Methodology", Retrieved at<<http://ieeexplore.ieee.org/stamp/stamp.jsp?arnumber=1369287&isnumber=29966>>, IEEE/ACM Transactions on Networking, vol. 12, No. 6, Dec. 2004, 2004 IEEE, Downloaded on Jan. 12, 2009, pp. 963-977.

Eriksen, et al. "Trickle: A Userland Bandwidth Shaper for Unix-like Systems", Retrieved at<<http://monkey.org/~marius/trickle/trickle.pdf>>, pp. 1-10.

Ghoshal, et al. "Variable Neighbor Selection in Live Peer-to-Peer Multimedia Streaming Networks", Retrieved at<<http://lakota.unl.edu/facdb/csefacdb/TechReportArchive/TR-UNL-CSE-2007-0021.pdf>>, UNL Department of Computer Science and Engineering, Technical Report TR-UNL-CSE-2007-021, Sep. 2007, pp. 6.

Hu, et al. "Evaluations and Characterization of Available Bandwidth Probing Techniques", Retrieved at<<http://ieeexplore.ieee.org/stamp/stamp.jsp?arnumber=1217275&isnumber=27368>>, IEEE Journal on Selected Areas in Communications, vol. 21, No. 6, Aug. 2003, pp. 879-894.

Hu, et al. "Exploiting Internet Route Sharing for Large Scale Available Bandwidth Estimation", Retrieved at<<http://www.imconf.net/imc-2005/papers/imc05efiles/hu/hu.pdf>>, pp. 6.

Jain, et al. "Pathload: A Measurement Tool for End-to-End Available Bandwidth", Retrieved at<<http://www.cc.gatech.edu/~jain/publications/pam02.pdf>>, This work was supported by the SciDAC program of the US Department of Energy, pp. 12.

Jin, et al. "On Maximizing Tree Bandwidth for Topology-Aware Peer-to-Peer Streaming", Retrieved at<<http://ieeexplore.ieee.org/stamp/stamp.jsp?arnumber=4378424&isnumber=4378421>>, IEEE Transactions on Multimedia, vol. 9, No. 8, Dec. 2007, pp. 1580-1592.

Lai, et al. "Nettimer: A Tool for Measuring Bottleneck Link Bandwidth", Retrieved at<<http://nms.lcs.mit.edu/~dina/MNM/mmdocs/nettimer.pdf>>, pp. 1-13.

Padhye, et al. "Bandwidth Estimation in Broadband Access Networks", Retrieved at<<http://www.imconf.net/imc-2004/papers/p314-lakshminarayanan.pdf>>, IMC'04, Oct. 25-27, 2004, Taormina, Sicily, Italy, pp. 314-321.

Melander, et al. "A New End-to-End Probing and Analysis Method for Estimating Bandwidth Bottlenecks", Retrieved at<<http://ieeexplore.ieee.org/stamp/stamp.jsp?arnumber=00892039>>, 2000 IEEE, pp. 415-420.

Ribeiro, et al. "Multifractal Cross Traffic Estimation", Retrieved at<<http://citeseerx.ist.psu.edu/viewdoc/download;jsessionid=2CA9E61BOAC144107112CDA9E2074825?doi=10.1.1.29.9411&rep=rep1&type=pdf>>, Proceedings ITC Specialist Seminar on IP Traffic Measurment, Modelling and Management, Sep. 2000, Monterey, CA, pp. 1-10.

Ribeiro, et al. "pathChirp: Efficient Available Bandwidth Estimation for Network Paths", Retrieved at<<http://citeseerx.ist.psu.edu/viewdoc/download?doi=10.1.1.12.7605&rep=rep1&type=pdf>>, pp. 1-11.

Shriram, et al. "Comparison of Public End-to-End Bandwidth Estimation Tools on High-Speed Links", Retrieved at<<http://wvvw.caida.org/publications/papers/2005/pam-bwest/pam-bwest.pdf>>, pp. 14.

Peterson, et al. "Using PlanetLab for Network Research: Myths, Realities, and Best Practices", Retrieved at<<http://www.planet-lab.org/files/pdn/PDN-05-028.pdf>>, PDN-05-028, Jun. 29, 2005, pp. 12.

Strauss, et al. "A Measurement Study of Available Bandwidth Estimation Tools", Retrieved at<<http://nms.lcs.mit.edu/~dina/pub/spruce.pdf>>, IMC'03, Oct. 27-29, 2003, Miami Beach, Florida, USA, pp. 6.

Vahdat, et al. "Evaluating Distributed Systems: Does Background Traffic Matter?", Retrieved at<<http://www.cs.ucsd.edu/~vandat/papers/usenix08.pdf>>, pp. 14.

"Communication Workers of America. Speed Matters: A Report on Internet Speeds in All 50 States", "CWA", Jul. 2007, pp. 59.

"International Telecommunication Union, Standardization Sector. ITU-T Recommendation V.92: Enhancements to Recommendation V.90", Nov. 2000, p. 1.

Douceur, J., et al.; "ThunderDome: Discovering Upload Constraints Using Decentralized Bandwidth Tournaments"; Proceedings of CoNEXT, Association for Computing Machinery, Inc.; Dec. 2009.

Douceur, J., et al.; "Collaborative Measurements of Upload Speeds in P2P Systems"; Proceedings of the 29th Annual IEEE Conference on Computer Communications (INFOCOM); Mar. 2010.

* cited by examiner

COLLABORATIVE SPEED DETERMINATION IN DISTRIBUTED SYSTEMS

BACKGROUND

An Internet path connecting two hosts can consist of multiple routers and physical links. A capacity of an individual link can be thought of as the maximum rate at which packets can be transmitted over the link. At any given time, the link's available bandwidth is its unused residual capacity. The capacity of an end-to-end path can be the minimum capacity among its constituent links. The path's available bandwidth is defined in a similar way. The present concepts relate to determining communication speeds, such as available bandwidths and/or capacities, in ad-hoc distributed groups.

There are many tools that estimate the available bandwidth along an end-to-end path. Some of these bandwidth estimation tools are discussed below. The present concepts can utilize bandwidth information from specifically mentioned bandwidth estimation tools or other tools. Most of these bandwidth estimation tools use one of two techniques. In a packet rate method, a source generates traffic at a variety of speeds, and the receiver reports its observed download rates. Above a certain transmission speed, a bottleneck link will become saturated, causing the receiving rate to fall below the sending rate. The available bandwidth is the lowest transmission rate which triggers this congestion. Named examples of this packet rate tool include packet transmission rate (PTR), pathload, trains of packet pairs (TOPP), and pathchirp.

In a packet gap method, a sender issues multiple packet pairs, carefully controlling the spacing between two packets in a pair. Assuming that the end-to-end path has a single bottleneck, any receiver-measured increase in the packet gap is due to cross-traffic at the bottleneck. Armed with the gap increase and the path capacity, one can calculate the volume of the cross-traffic and then the remaining available bandwidth. Named tools that use the packet gap technique include initial gap increasing (IGI), Delphi, and Spruce.

Another technique termed "BRoute" attempts to minimize probing traffic by exploiting two observations. First, most bottleneck links reside at the edge of the network. Second, in large systems, each edge link is likely to be shared by multiple end-to-end paths. By only probing edge links, BRoute can identify most sources of congestion without exhaustive introspection of each link in a path. Furthermore, the probing cost for each edge segment is amortized across the set of peers which use that segment.

Unlike the other tools described above, BRoute uses dedicated network infrastructure where hosts discover their edge links by issuing traceroutes to well-known landmark nodes. BRoute also uses border gateway protocol (BGP) data to determine which edge segments connect end hosts. The present concepts generally relate to ad-hoc groups, meaning that dedicated infrastructure is unlikely to exist. Often the ad-hoc groups are composed of "regular" end-users who lack access to privileged BGP feeds utilized by the BRoute tool.

Like all measurement tools, the above mentioned bandwidth estimators do not generate perfectly accurate results. Some of the measurement error arises from the simplifying assumptions embedded in the design of the tools. For example, tools often assume that all routers use a first-in-first-out (FIFO) queuing discipline, and that the volume of cross-traffic is stationary. Resource constraints on the measurement hosts can also cause poor estimations. In particular, many tools utilize fine-grained timers to control the rate at which packets are sent. They also use accurate timestamps for received packets. On highly loaded machines, the operating system (OS) may be unable to provide the necessary fidelity. Even a lightly loaded machine may underestimate a high-capacity link if the native timestamp resolution is too coarse.

Because of these issues, the output of a bandwidth estimation tool should not be taken as ground truth. For example, pathchirp underestimates available bandwidth when the volume of cross-traffic is low, but overestimates when cross-traffic is high. Bandwidth estimates are also sensitive to the size of probe packets, but different paths may be optimally measured with different packet sizes, and generating this mapping is not straight forward. Thus, measurement jitter is often non-trivial—in controlled settings, the standard deviation of measurement can be 30% or more.

SUMMARY

The described implementations relate to collaborative speed determination mechanisms. One such collaborative speed determination mechanism estimates upload speeds of a plurality of hosts in a distributed setting. In one implementation, the collaborative speed determination mechanism sends a first bandwidth probe from a first host to a second host. The collaborative speed determination mechanism receives, at the first host, a second bandwidth probe sent from the second host. The collaborative speed determination mechanism determines which of the first and second bandwidth probes was relatively slower. The collaborative speed determination mechanism designates either of the first or second hosts that sent the relatively slower bandwidth probe as a loser and takes a speed of the bandwidth probe of the loser as a first estimate of the loser's upload speed. In some cases, the collaborative speed determination mechanism can execute bandwidth probe(s) using any of the tools described in the background section, among others. The collaborative speed determination mechanism can then leverage the information provided by these tools as described in the discussion below.

The above listed examples are intended to provide a quick reference to aid the reader and are not intended to define the scope of the concepts described herein. The term "collaborative speed determination mechanisms," as used herein, may refer to system(s), device(s), component(s), method(s), technique(s) and/or computer-readable instructions (e.g., one or more computer-readable media having executable instructions), as permitted by the context above and throughout this document.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application relates to collaborative speed determination, and more specifically, to determination of communication speeds in ad-hoc distributed groups.

Distributed or Peer-to-peer (P2P) streaming systems can improve their delivery rates by adjusting the selection of neighbors according to peer bandwidth. Accordingly, over the past few years, a number of P2P systems have attempted to optimize the use of peers' upload bandwidth. In wider contexts, multicast systems can benefit by changing their interconnection topology in a bandwidth-sensitive fashion. P2P game systems exploit network heterogeneity by precisely allocating communication tasks to peers in accordance with their upload speeds. All of these systems assume that the peers' upload bandwidth constraints are already known.

However, in the absence of dedicated infrastructure or privileged access to BGP data, efficiently determining upload constraints is an unsolved problem. A host can use one of many existing bandwidth estimation tools (such as those described in the background section) to determine its upload bandwidth to a particular endpoint. However, the result of this process is not necessarily the host's upload speed, because the effective bandwidth measured by the tool is constrained by the most restrictive link on the path from the host to the remote end point. Since access links are typically much more restrictive than the Internet routing core, the result of the bandwidth measurement is the lesser of the host's upload speed and the remote endpoint's download speed.

Thus, to confidently measure its upload speed, a host selects a remote endpoint with a greater download bandwidth than its own (as yet undetermined) upload bandwidth. However, the host has no a priori way to find such an endpoint. Even if the host selects a very high-capacity remote endpoint, the bandwidth available for the host's measurement may be insufficient. For instance, if many other hosts are concurrently sending to that endpoint, then the bandwidth available to the host may be insufficient.

To address these and other challenges, the present concepts relate to collaborative speed determination mechanisms for determining upload bandwidths in ad-hoc peer-to-peer environments.

In some implementations, the collaborative speed determination mechanism's measurement primitive is a pairwise bandwidth probe, in which two hosts measure the data-transfer rate between each other in both directions. Given the asymmetric upload/download speeds typical of access networks (including dial-up, cable modem, and DSL); the slower of the two unidirectional transfers reveals the upload bandwidth of the sending node. The collaborative speed determination mechanisms can organize probes in a bandwidth tournament. Since a probe reveals the upload bandwidth of the slower sender, the faster sender is successively paired with other hosts until it is matched against one whose download bandwidth is high enough to reveal the host's upload bandwidth.

In practice, bandwidth probes are subject to measurement errors. These errors can interfere with the determination of which host's upload bandwidth is revealed by a probe, thereby corrupting the tournament. Collaborative speed determination mechanisms can correct these corruptions with additional "tightening" probes that do not add to the running time. The results of multiple probes for a given host are aggregated using the technique of α-tightening, which can average out measurement error without incorporating erroneously low measurements. For scalability, the coordination of the hosts' probes can be distributed among the hosts themselves.

First Example of Collaborative Speed Determination Mechanisms

1. Algorithmic Foundations

This section formally defines the bandwidth estimation problem in peer-to-peer networks and presents basic algorithmic tools to solve it. For ease of explanation, throughout this section, an abstract model is used that ignores several issues like measurement error. However, the practical algorithms that are subsequently described are derived from the basic techniques in this section.

1.1 Model & Problem Definition

This abstract model is based on two primary assumptions that relate to the hub-and-spoke model and directional asymmetry. Relative to the hub-and-spoke model, the discussion is based, first, on the assumption that bandwidth bottlenecks typically occur on last-mile edge links, and, second, that the core of the Internet has essentially unlimited bandwidth (relative to a single host's upload speed). Relative to directional asymmetry, the discussion is based on the assumption that the download bandwidth of each host is at least as large as its upload bandwidth. This is true for the vast majority of network access technologies.

For the moment, the discussion is also based on the assumption that there are no measurement errors (i.e., one-way path bandwidths can be determined with perfect accuracy). This assumption is re-addressed in Section 2. At this point in the discussion, one goal is to introduce basic algorithms that can allow every node to quickly determine its upload speed. Bandwidth probes are the primary building blocks for these algorithms.

A bandwidth probe can be thought of as a pairing of two hosts $h_i$ and $h_j$, such that $h_i$ transmits data to $h_j$ at full speed and vice versa. Such a bandwidth probe is denoted as $h_i \leftrightarrow h_j$. The result of a bandwidth probe $h_i \leftrightarrow h_j$ is two measurements, denoted by $P(h_i \rightarrow h_j)$ and $P(h_j \rightarrow h_i)$. $P(h_i \rightarrow h_j)$ is the speed at which data was transmitted from $h_i$ to $h_j$. This is the minimum of $h_i$'s upload and $h_j$'s download, i.e., $$P(h_i \rightarrow h_j) = \min\{u_i, d_j\}.$$

Similarly, the transfer speed in the opposite direction reveals the minimum of $h_j$'s upload and $h_i$'s download, i.e., $$P(h_j \rightarrow h_i) = \min\{u_j, d_i\}.$$

For each bandwidth probe, one of the two hosts is the winner, denoted by $W(h_i \leftrightarrow h_j)$. The other host is the loser $L(h_i \leftrightarrow h_j)$. Specifically, if $P(h_i \rightarrow h_j) > P(h_j \rightarrow h_i)$, then $h_i$ is the winner and $h_j$ is the loser. If $P(h_j \rightarrow h_i) > P(h_i \rightarrow h_j)$, then $W(h_i \leftrightarrow h_j) = h_j$ and $L(h_i \leftrightarrow h_j) = h_i$.

Given $P(h_i \rightarrow h_j)$ and $P(h_j \rightarrow h_i)$, and the assumption that $d_i > u_i$ and $d_j > u_j$, the following information can be derived from a pairwise exchange $h_i \leftrightarrow h_j$:

If $P(h_i \rightarrow h_j) \geq P(h_j \rightarrow h_i)$, it follows that $u_j = P(h_j \rightarrow h_i)$. If $P(h_i \rightarrow h_j) \leq P(h_j \rightarrow h_i)$ then $u_i = P(h_i \rightarrow h_j)$. In other words, in the absence of measurement error, a pairwise bandwidth probe reveals (at least) the upload bandwidth of the loser.

While the smaller of the two directional probes corresponds to the upload bandwidth of the loser, the larger probe can either be the loser's download bandwidth or the winner's upload bandwidth.

Disambiguating the latter condition can be difficult. For example, if $u_i < u_j$, then a bandwidth probe will reveal that $u_i = P(h_i \rightarrow h_j)$. If it is also known that $d_i \geq u_j$, then the probe could additionally reveal $u_j = P(h_j \rightarrow h_i)$. Unfortunately, there is no a priori way for the hosts to determine whether $d_i \geq u_j$ is true, i.e., whether the bottleneck in the transfer from $h_j$ to $h_i$ is $h_j$'s upload speed or $h_i$'s download speed. For instance, consider the example of FIG. 1 described below.

Figure 1:
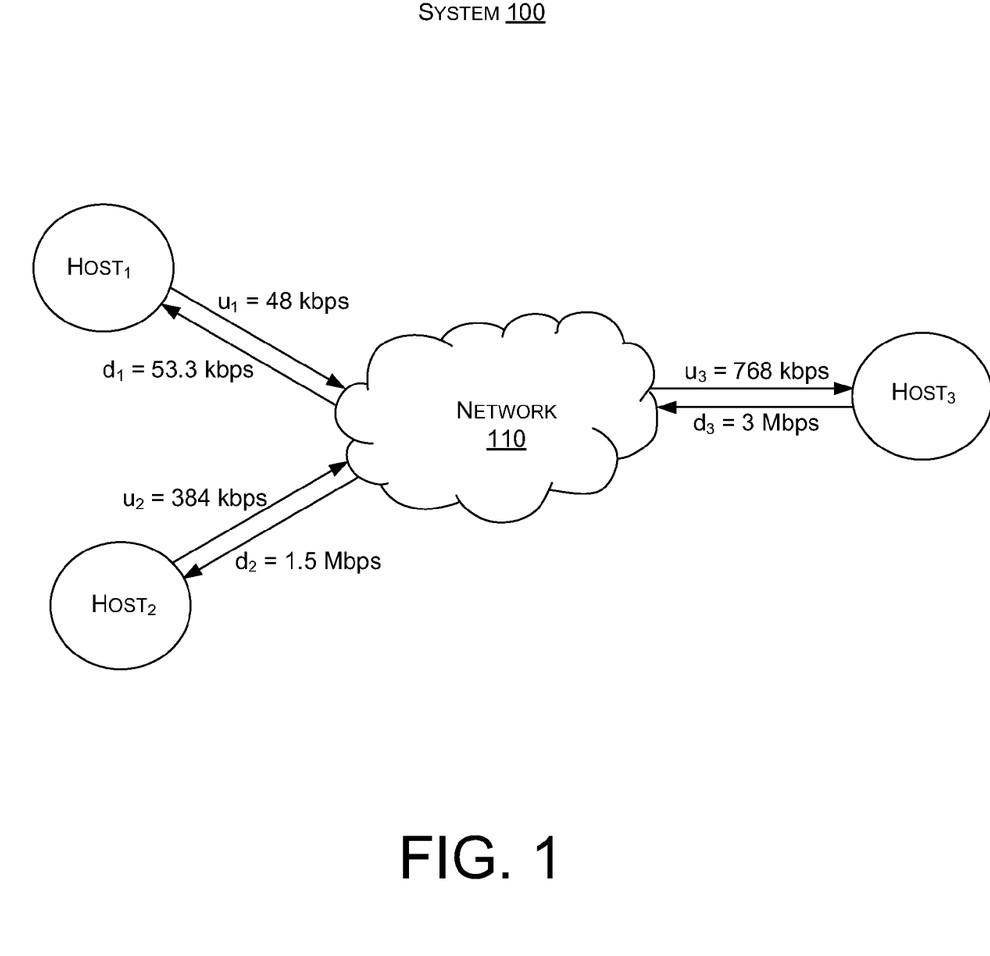
FIG. 1 shows an example of a system upon which collaborative speed determination can be accomplished in accordance with some implementations of the present concepts.

FIG. 1 shows a system 100 that includes three hosts (host$_1$ or $h_1$, host$_2$ or $h_2$, and host$_3$ or $h_3$) that are communicably coupled via a network 110, such as the Internet. In the illustrated configuration, host$_1$ has an upload speed $u_1$ of 48 kilobytes per second (kbps) and a download speed $d_1$ of 53.3 kbps. Host$_2$ has an upload speed $u_2$ of 384 kbps and a download speed $d_2$ of 1.5 megabytes per second (Mbps). Host$_3$ has an upload speed $u_3$ of 768 kbps and a download speed $d_3$ of 3 Mbps.

While not specifically shown, an Internet path connecting two hosts can consist of multiple routers and physical links. A capacity of an individual link is the maximum rate at which it can transmit packets. At any given time, the link's available bandwidth is its unused residual capacity. The capacity of an end-to-end path is the minimum capacity among its constituent links. The path's available bandwidth is defined in a similar way. Note that these terms are defined with respect to a specific transmission direction, since a path's capacity or available bandwidth along $X \rightarrow Y$ may be different that its capacity or available bandwidth along $Y \rightarrow X$.

As mentioned above in the background section, there are several pre-existing tools which measure one-way path capacities. There are also pre-existing tools which measure one-way available bandwidths. Collaborative speed determination mechanism's tournament system is designed to measure abstract "upload speeds." Such speeds may be defined as capacities, available bandwidths, or some other notion of throughput for hosts with asymmetric upload/download constraints. Since the present collaborative speed determination mechanisms can be agnostic as to what a "one-way bandwidth probe" actually measures, the collaborative speed determination mechanisms can use current and future one-way estimation tools as "black boxes" whose probing activities are scheduled via the tournament mechanism.

In the illustrated case of FIG. 1, a bandwidth probe ("P") (not specifically designated) between host$_1$ and host$_3$ ($h_1 \leftrightarrow h_3$) reveals only $h_1$'s upload bandwidth, since $P(h_3 \rightarrow h_1) = d_1$. $P(h_1 \rightarrow h_3) = u_1$. This probe does not reveal host$_3$'s upload bandwidth because host$_1$'s download speed of 53.3 kbps is less than host$_2$'s upload bandwidth of 768 kbps. In contrast, $h_2 \leftrightarrow h_3$ actually reveals both uploads (i.e., $P(h_2 \rightarrow h_3) = u_2$ and $P(h_3 \rightarrow h_2) = u_3$), but $h_3$ cannot be sure that the measurement $P(h_3 \rightarrow h_2)$ is indeed its own upload.

This missing information relative to host$_3$ is one of the primary motivations for the use of bandwidth tournaments to resolve each host's upload constraint. This uncertainty can be eliminated by employing a series of bandwidth probes.

These definitions can be utilized to formally define the bandwidth estimation problem in P2P networks.

Bandwidth Estimation Problem: For discussion purposes, let H denote the set of n participating hosts $H = \{h_1, \ldots, h_n\}$. Each host is connected to the Internet via an access link with download bandwidth $d_i$ and upload bandwidth $u_i$, such that $d_i \geq u_i$ for all i. Initially, no host has knowledge about its upload or download bandwidth. One goal is to employ a series of bandwidth probes such that in the end, most or all nodes know their $u_i$.

For discussion purposes, assume that time is divided into rounds, where a round is the unit of time required to conduct one pairwise bandwidth probe. In each round, every host can participate in one bandwidth probe with a single peer. Thus, up to n/2 bandwidth probes can be done in parallel. When comparing various algorithms for solving the bandwidth estimation problem, a key evaluation metric is running time.

Time Complexity: The time complexity TC(A) of an algorithm A is the maximum number of rounds during which there is at least one bandwidth probe.

1.2 Simple Approaches

Centralized Server (CS): In small-scale systems, a common way to determine upload speeds is to have nodes do a bandwidth probe with a central server that is known to have very high download bandwidth. This approach does not exploit the upstream and downstream bandwidths of the other hosts in the system, but it has the benefit of being simple and easy to implement. Unfortunately, as n gets larger, the time complexity of such an approach tends to scale poorly. Specifically, given a server with download speed $d_s$, the time complexity of this approach is at least $T(CS) \geq \Sigma_{h_i \in H} u_i / d_s$, i.e., even with optimal coordination, the time complexity grows linearly.

Random Sampling (RS): A potentially more clever idea is to increase parallelism by making use of the available download bandwidth of all participating hosts, instead of only the server. Indeed, if every hosts' download bandwidth was higher than every host's upload bandwidth ($d_i \geq u_j, \forall i,j$), the problem would be trivial in the absence of measurement errors. After a single round of probing with random host pairs, every host would know its upload bandwidth. In practice, of course, some downloads will be lower than some of the uploads, rendering the above scheme unusable.

A multi-round peer-to-peer approach would partially alleviate the problem. In each round, every host is randomly paired with another host, resulting in n/2 independent parallel bandwidth probes in each round. Once a host is the loser of a bandwidth probe, it will know its upload bandwidth.

1.3 Collaborative Speed Determination Mechanism—Bandwidth Tournaments

A basic algorithm is now presented that is more efficient than the simple approaches discussed in the previous section.

In the absence of measurement errors, the idea of the collaborative speed determination mechanisms is potentially simple. Since in every bandwidth probe, the loser learns about its upload bandwidth, only the winners need to continue being paired with each other. As described in Algorithm 1, collaborative speed determination mechanisms pair winners with each other. As soon as a node loses a bandwidth probe, it no longer participates in the subsequent rounds.

---

Algorithm 1 Basic collaborative speed determination mechanism algorithm

---

Figure 2:
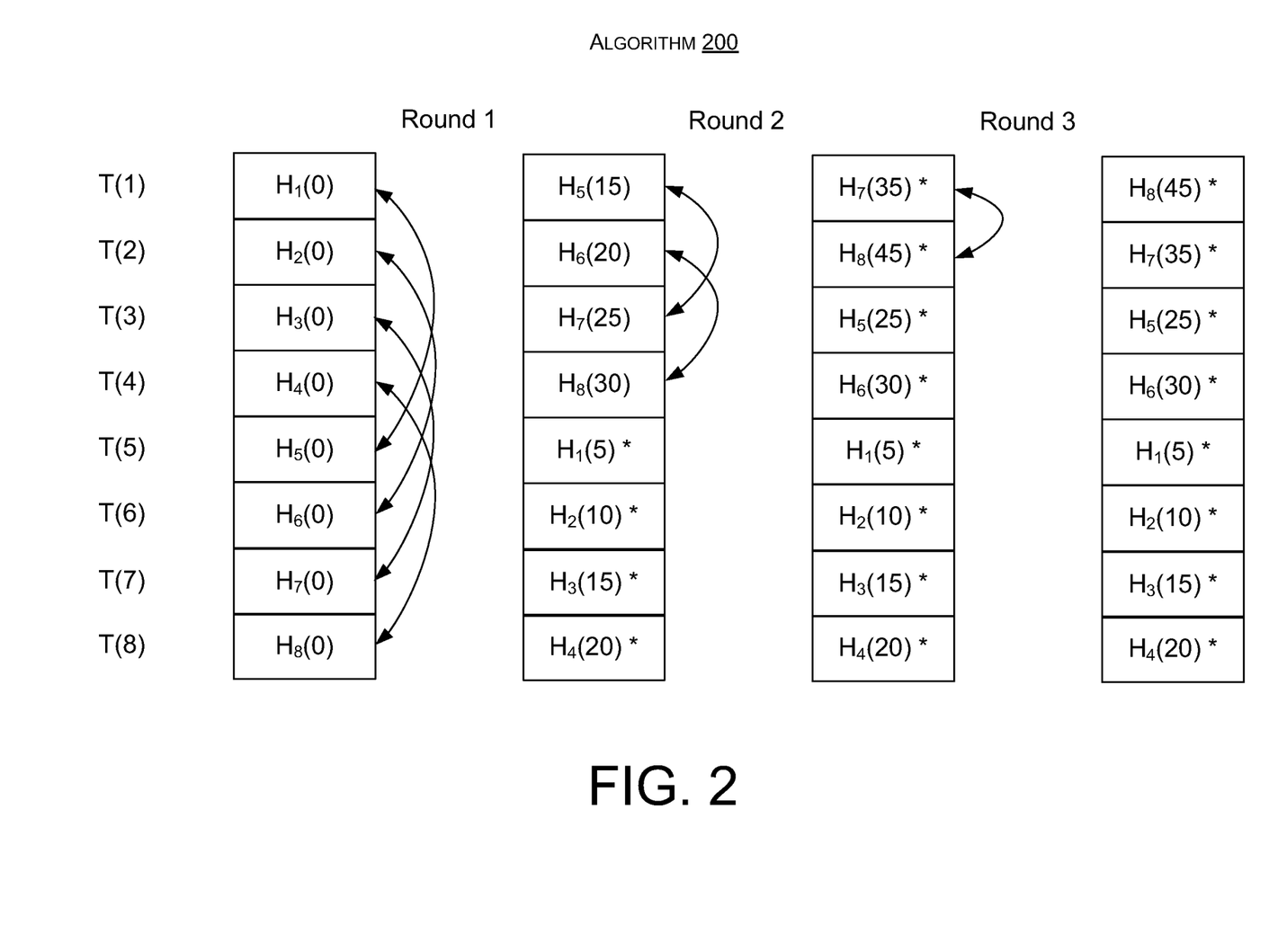
FIGS. 2-3 show examples of algorithms that can be utilized for collaborative speed determination in accordance with some implementations of the present concepts.

Input: Set of n hosts $\{h_i | i \in [1 \ldots n]\}$
Count k of rounds to run
Output: None; hosts accumulate data as a side effect
1: Set $T(i) := h_i$ for each $i \in [1 \ldots n]$
2: for r := 1 to k do
3:    for all $i \in [1::n/2^r]$ do
4:       Set $j := n/2^r + i$
5:       Perform probes $T(i) \leftrightarrow T(j)$
6:       if host T(j) wins then
7:          Swap T(i) and T(j)
8:       end if
9:    end for
10: end for Whereas random sampling had bad worst-case performance, it is easy to see that collaborative speed determination mechanisms have a time complexity of log n regardless of the bandwidth distribution, because in every round, at least half of the remaining hosts resolve their upload bandwidth. FIG. 2 demonstrates the operation of the algorithm.

FIG. 2 shows an example progression of basic algorithm 200 where (n=8, $u_i$=5·i, $d_i$=$u_i$+10). Estimates are in parentheses, and are accompanied by a star ("*") when correct. After round 2, $h_7$ and $h_8$ are correct but not yet known to be so.

Theorem 1.3. In the absence of measurement errors, it holds for every bandwidth distribution that after k rounds, at least $n/2^k$ hosts know their upload bandwidth, therefore TC(TD)=log n.

2. Dealing with Probing Errors

Up to this point, the discussion is based upon the assumption that bandwidth probes yield accurate results. However, bandwidth-estimation tools can produce significantly erroneous results, with individual measurements deviating from true bandwidths by 30% or more. This is not because the tools are weak. Instead, it is because the problem is hard. The behavior of the routing core is largely opaque to end hosts, forcing them to make behavioral assumptions that are often violated. The resulting errors can alter the control flow of bandwidth aware systems and yield sub-optimal performance.

For reference, several terms are defined below:
fractional probing error:

$$\frac{BW\ \text{probe}}{BW\ \text{true}} - 1.0 - 1.0$$

fractional estimation error:

$$\frac{BW\ \text{estimate}}{BW\ \text{true}} - 1.0 - 1.0$$

Since a bandwidth estimate is simply the result of one of the two probes in a pairwise exchange, one might think that the bandwidth estimation error will not exceed the probing error. Surprisingly, this is not correct. As explained below, the estimation error may be as high as $\max_{i \in [1\ \ldots\ n]} u_i - \min_{i \in [1\ \ldots\ n]} d_i$, (i.e., the difference between the largest upload speed and the smallest download speed of any host in the system). Depending on the distribution of host bandwidths, this spread may grow arbitrarily large with respect to the probing error. In particular, the basic collaborative speed determination mechanisms algorithm can dramatically underestimate upload bandwidth.

Thus, the collaborative speed determination mechanisms algorithm can be modified to hedge against faulty probe measurements. In particular, it can be shown that the decoupling of estimation error from probing error causes dramatic underestimation of true upload capacities. To recover from this underestimation bias, collaborative speed determination mechanisms treat each $u_i$ estimate as a provisional floor on the true estimate. Using a small number of additional pairwise exchanges, collaborative speed determination mechanisms can push the upload floors closer to the real $u_i$ values.

2.1 Problem: Mismeasurement Occlusion

Recall that one of the enabling assumptions of the collaborative speed determination mechanisms is directional asymmetry. Each node's upload bandwidth is no greater than its download bandwidth. However, the difference between these two bandwidths may be smaller than the probing error. This can cause collaborative speed determination mechanisms to reach an incorrect conclusion about which host's bandwidth is determined by a particular probe.

Consider again the system 100 of FIG. 1 and a probe between $h_1$ and $h_3$. In the absence of probing error, $P(h_1 \rightarrow h_3)$=48 kbps and $P(h_3 \rightarrow h_1)$=53.3 kbps. Since $P(h_1 \rightarrow h_3) < P(h_3 \rightarrow h_1)$, collaborative speed determination mechanisms will correctly conclude that 48 kbps is $h_1$'s upload bandwidth.

Now consider a fractional probing error of up to 15%. In the worst case, $P(h_1 \rightarrow h_3)$=55.2 kbps and $P(h_3 \rightarrow h_1)$=45.3 kbps. Since now $P(h_3 \rightarrow h_1) < P(h_1 \rightarrow h_3)$, collaborative speed determination mechanisms will wrongly conclude that 45.3 kbps is $h_3$'s upload bandwidth. Since the true value of $u_3$ is 768 kbps, this is a fractional estimation error of more than −94%, even though the probing error is only 15%.

This discussion refers to this phenomenon as mismeasurement occlusion. A host's upload bandwidth is occluded by an incorrectly measured value of its probe-partner's download bandwidth. The frequency of mismeasurement occlusion depends on the degree of probing error relative to the separation between host's upload and download speeds. As probing error increases, a greater fraction of hosts will be vulnerable to mismeasurements that are large enough to occlude their probe-partners' measurements.

The result of mismeasurement occlusion is underestimation bias. The basic collaborative speed determination mechanisms algorithm tends to underestimate host bandwidths. The magnitude of the estimation error depends on the bandwidth skew in the network. Let $\hat{u}_i u$ and $\hat{d}_i d$ represent the (possibly erroneous) measurement of $h_i$'s bandwidth in a pairwise exchange. In the worst case, the estimation error for any other host $h_j$ is $\min_{i \in [1\ \ldots\ j-1, j+1\ \ldots\ n]} \{\hat{d}_i | \hat{u}_i > \hat{d}_i\} - u_j$. As bandwidth heterogeneity grows, this worst-case estimation error increases unbounded by probing error.

In practice, underestimation bias tends to occur in systems with a mix of high-speed connections and either wireless devices or dial-ups. Survey data indicates that at least 30% of Americans connect to the Internet using dial-up modems, whose upload speeds are an order of magnitude smaller than that of mid-range DSL and cable connections.

2.2 Tightening

In the basic collaborative speed determination mechanisms algorithm, once a host loses a bandwidth probe, its bandwidth estimate is established and never revised. To combat underestimation bias resulting from mismeasurement occlusion, the present implementations can allow losers to perform additional probes with other hosts. Each losing probe $P(h_i \rightarrow h_j)$ provides a provisional lower bound on $h_i$'s true upload bandwidth. Given a set of such bounds from multiple probes from $h_i$, the collaborative speed determination mechanisms can use the highest one as the estimate of $u_i$. Thus, a high-bandwidth node with a dramatically underestimated upload speed (due to mismeasurement occlusion) can revise its estimate upward if it subsequently pairs with another high-speed node.

A straightforward way to provide such additional pairings is to perform one or more tightening rounds at the end. Each tightening round, can first sort all hosts by their upload estimates: $\forall i \in [1\ \ldots\ n-1] : \hat{u}_{s(i)} < \hat{u}_{s(i+1)}$. Then, probes can be performed between pairs of hosts with widely separated ranks: $\forall i \in [1\ \ldots\ n/2] : h_{s(i)} \leftrightarrow h_{s(i+n/2)}$. Each tightening round utilizes n/2 probes, which can all proceed in parallel.

2.3 Inline Tightening

Adding tightening rounds at the end, as described above, has two potential disadvantages. First, additional tightening rounds can increase the running time of the algorithm. Second, adding tightening rounds treats all hosts identically, even though some hosts are more likely to experience mismeasurement occlusion than others.

To elaborate on this second point, note that a host that wins a few rounds will tend to have higher measured bandwidth than a host that loses earlier in the tournament. Furthermore, this winning host will subsequently be paired with other winning hosts, which also have high measured bandwidths. Consequently, the potential for mismeasurement occlusion decreases as the tournament proceeds. Thus, the hosts that have the most to gain from tightening tend to be the losers of early rounds.

The present concepts can address both of these issues by inlining the tightening procedure. When a host loses round r, rather than merely waiting around for k−r more rounds and then performing tightening, the host can perform its tightening steps during these k−r rounds, without adding to the overall running time. Furthermore, hosts that lose early—and which thus potentially have the most need for tightening—have more time to perform a greater number of tightening rounds.

Figure 3:
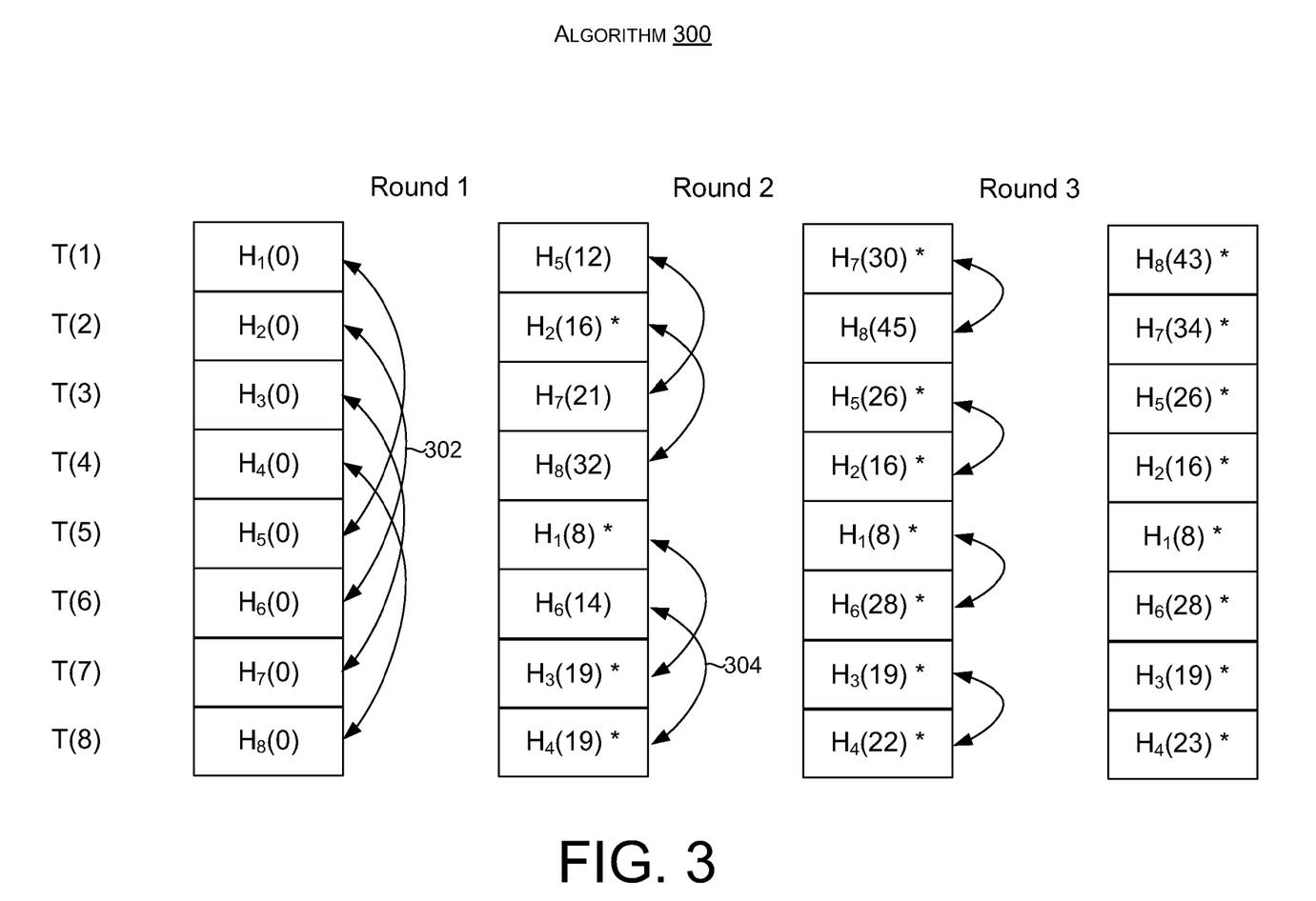

Algorithm 2 describes how collaborative speed determination mechanisms perform this inline tightening, and FIG. 3 shows an example. Briefly, the nodes are arranged at the vertexes of a (log n)-dimensional hypercube. On each round, probes are performed between hosts that are paired along one axis of the hypercube.

---

Algorithm 2 Collaborative speed determination mechanisms with inline tightening

---

Input: Set of n hosts $\{h_i | i \in 2 [1 \ldots n]\}$, number of rounds k
Output: None; hosts accumulate data as a side effect
1: Set $T(i) := h_i$ for each $i \in [1 \ldots n]$
2: for r := 1 to k do
3:  for all $x \in [0..2^{r-1} - 1]$ do
4:   for all $y \in [0..n/2^r - 1]$ do
5:    Set $i := n/2^{r-1} x + y + 1$
6:    Set $j := i + n/2^r$
7:    Perform probes between hosts T(i) and T(j)
8:    if host T(j) wins then
9:     Swap T(i) and T(j)
10:    end if
11:   end for
12:  end for
13: end for

---

FIG. 3 illustrates an example progression of an algorithm 300 with inline tightening, for n=8, $u_i$=5·i, $d_i$=$u_i$+10, and error±6. In round 1, $h_6$ incorrectly loses to $h_2$ at 302. In round 2, a probe with $h_4$ corrects $h_6$'s underestimate at 304.

α-tightening: A potential advantage of the inline tightening approach is that the most vulnerable hosts perform potentially many rounds of tightening. However, given that each host can now obtain multiple bandwidth estimates during the course of the algorithm, the question is, how—based on all these samples—it should derive its final estimate? Taking the maximum over all samples can lead to overestimation, which follows directly from the theory of order statistics.

Conversely, if the mean is taken over all samples, measurement errors will be averaged out, but the mean will incorporate even very low estimates caused by mismeasurement occlusion, which undermines the very purpose of tightening.

One implementation referred to as "α-tightening" can potentially obtain the best of both schemes. If the host's largest measurement sample is $\hat{U}_{max}$, then α-tightening compute the host's bandwidth estimate as the mean over all samples in the range $[\alpha \cdot \hat{U}_{max}, \hat{U}_{max}]$, for some specified value of α. This preserves the averaging properties of the mean, without incorporating erroneously low estimates.

3. Distributed Collaborative Speed Determination Mechanisms

In the above mentioned collaborative speed determination mechanism implementations, the probing effort is distributed among the hosts, which execute their bandwidth probes in parallel during each round. However, as presented above, the hosts can require coordination at each round, to determine pairings for the subsequent round. The straightforward way to coordinate the hosts is with a central leader. On each round r, the leader receives the results of all probes from round r−1, computes a schedule for the hosts according to one pass of the outer loop in Algorithm 1 or 2, and tells each host who to pair with on round r.

For large systems, the network-transmission load on the leader can become substantial. It is even possible that, in each round, more time could be spent by the leader (serially) sending instructions to each host than by the hosts (in parallel) sending probes to each other.

This section discusses two ways to deal with this problem: partitioning and distributed coordination.

3.1 Partitioning

One simple way to reduce the communication load on the leader is to partition the set of n hosts into g subsets. Then one host in each subset can be nominated to serve as a sub-leader for that subset. The sub-leader can perform g instances of the algorithm in parallel, with n/g hosts in each instance.

Analysis shows that simple partitioning may have an excessively detrimental effect on the result of the bandwidth tournament. Even with hundreds of hosts, the failure probability is non-trivial. Moreover, this probability can be highly dependent on characteristics of a small fraction of the population, making it difficult to quantify.

3.2 Distributed Coordination

An alternative approach to reducing the leader's communication load is to distribute the coordination effort among the hosts in the system, while preserving the schedule of probes that would be performed under centralized coordination. Collaborative speed determination mechanisms employ a set of $n-n/2^k$ coordinators, each of which is responsible for coordinating a probe between a pair of hosts.

In the distributed version of the basic collaborative speed determination mechanisms, each host is initially assigned to a coordinator $c_{init}$. In each round, the host merely contacts its coordinator, learns which host it should probe, executes its probe, and updates its coordinator based on the result of the probe, as specified in Algorithm 3.

---

Algorithm 3 Distributed collaborative speed determination mechanisms-Host

---

Input: Initial coordinator $c_{init}$ for the host
Output: None; host accumulates data as a side effect
1: Set $c := c_{init}$
2: while $c \neq \bot$ do
3:  Ask coordinator c for instructions
4:  Receive partner h' and next coordinator $c_{next}$ from c
5:  Perform probes to/from host h'
6:  if current host wins round then
7:   $c := c_{next}$
8:  else
9:   stop
10:  end if
11: end while

---

The job of each coordinator is even simpler. The coordinator waits to be contacted by two hosts, at which point the coordinator tells the hosts about each other. The coordinator also tells the hosts about its parent coordinator $c_{next}$, which it was assigned at initialization as can be appreciated from Algorithm 4.

---

Algorithm 4 Distributed collaborative speed determination mechanisms-Coordinator

---

Input: Parent coordinator $c_{next}$
Output: None
1: Wait for messages from any two hosts, $h_i$ and $h_j$
2: Send ($h_j$ and $c_{next}$) to $h_i$
3: Send ($h_i$ and $c_{next}$) to $h_j$
4: stop

---

Figure 4:
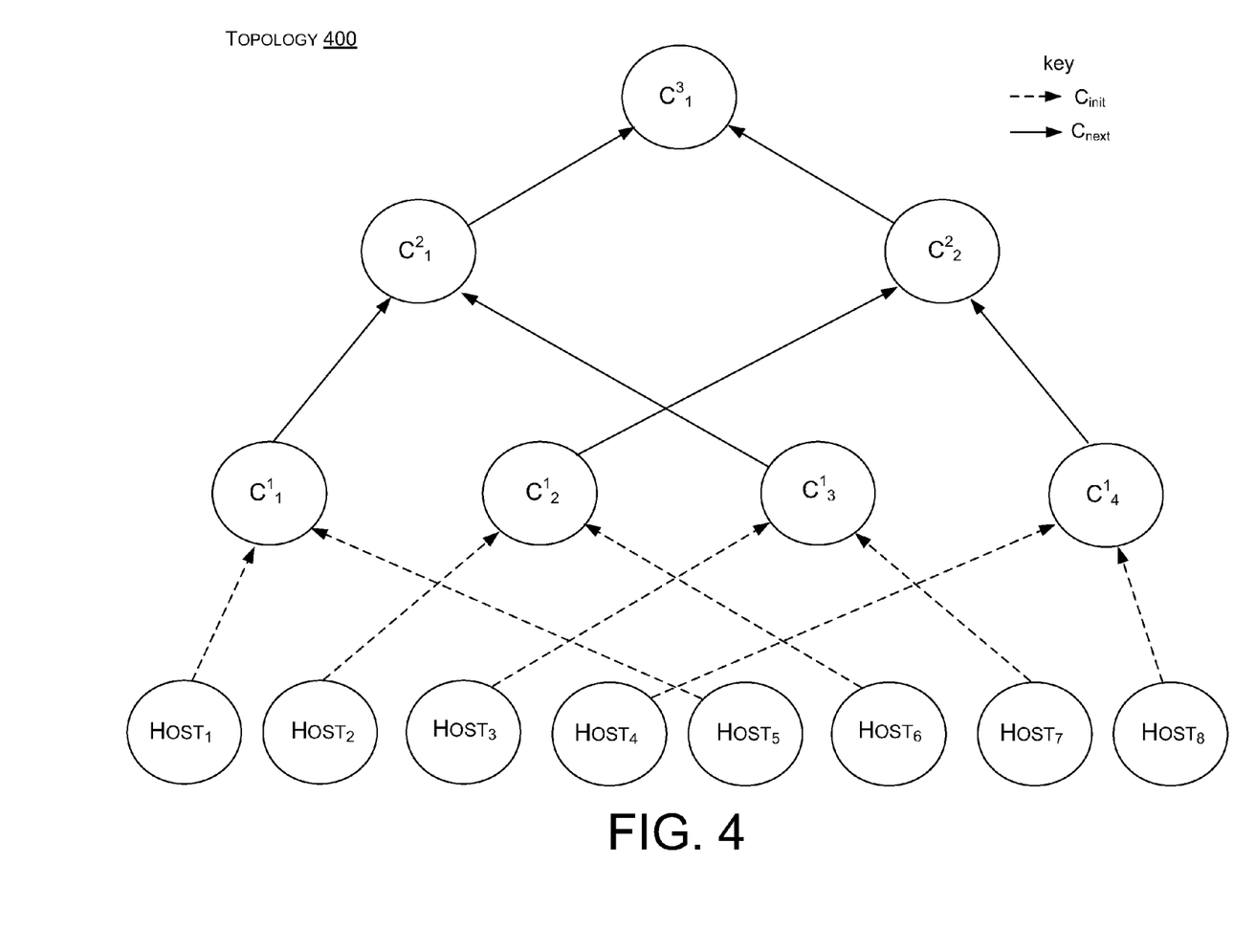
FIGS. 4-5 show examples of probe topologies for use with collaborative speed determination mechanisms in accordance with some implementations of the present concepts.

The crux is the initialization, which sets $c_{init}$ for all hosts and $c_{next}$ for all coordinators, according to Algorithm 5. FIG. 4 illustrates the resulting topology 500 for n=8.

---

Algorithm 5 Distributed collaborative speed determination mechanisms-Initialization

---

Input: Set of n hosts $\{h_i \mid i \in [1 \ldots n]\}$
    Count k of rounds to run
    Set of $n-n/2^k$ coordinators $\{c^r_i \mid r \in [1 \ldots k]; i \in [1..n/2^r]\}$
Output: Assignment of $c_{init}$ for each host
    Assignment of $c_{next}$ for each coordinator
    1: for all $r \in [1 \ldots k]$ do
    2:  for all $i \in [1 \ldots n/2^r]$ do
    3:    Set $j := n/2^r + i$
    4:    if r = 1 then
    5:      Set $h_i \cdot c_{init} := c^1_i$
    6:      Set $h_j \cdot c_{init} := c^1_i$
    7:    else
    8:      Set $c^{r-1}_i \cdot c_{next} := c^r_i$
    9:      Set $c^{r-1}_j \cdot c_{next} := c^r_i$
    10:   end if
    11:  end for
    12: end for
    13: for all $i \in [1..n/2^k]$ do
    14:  Set $c^k_i \cdot c_{next} := \perp$
    15: end for

---

The distributed algorithm results in the exact same set of probes as the centralized algorithm.

5.3 Distributed Inline Tightening

The distributed version of collaborative speed determination mechanisms with inline tightening is similar to the above, but slightly more involved. When the host updates its coordinator based on the result of a probe, the host selects one of two next coordinators, $c_{win}$ and $c_{lose}$, as specified in Algorithm 6. Similarly, each coordinator is assigned two parent coordinators, $c_{win}$ and $c_{lose}$, which it tells the hosts about when contacted, as specified in Algorithm 7.

Figure 5:
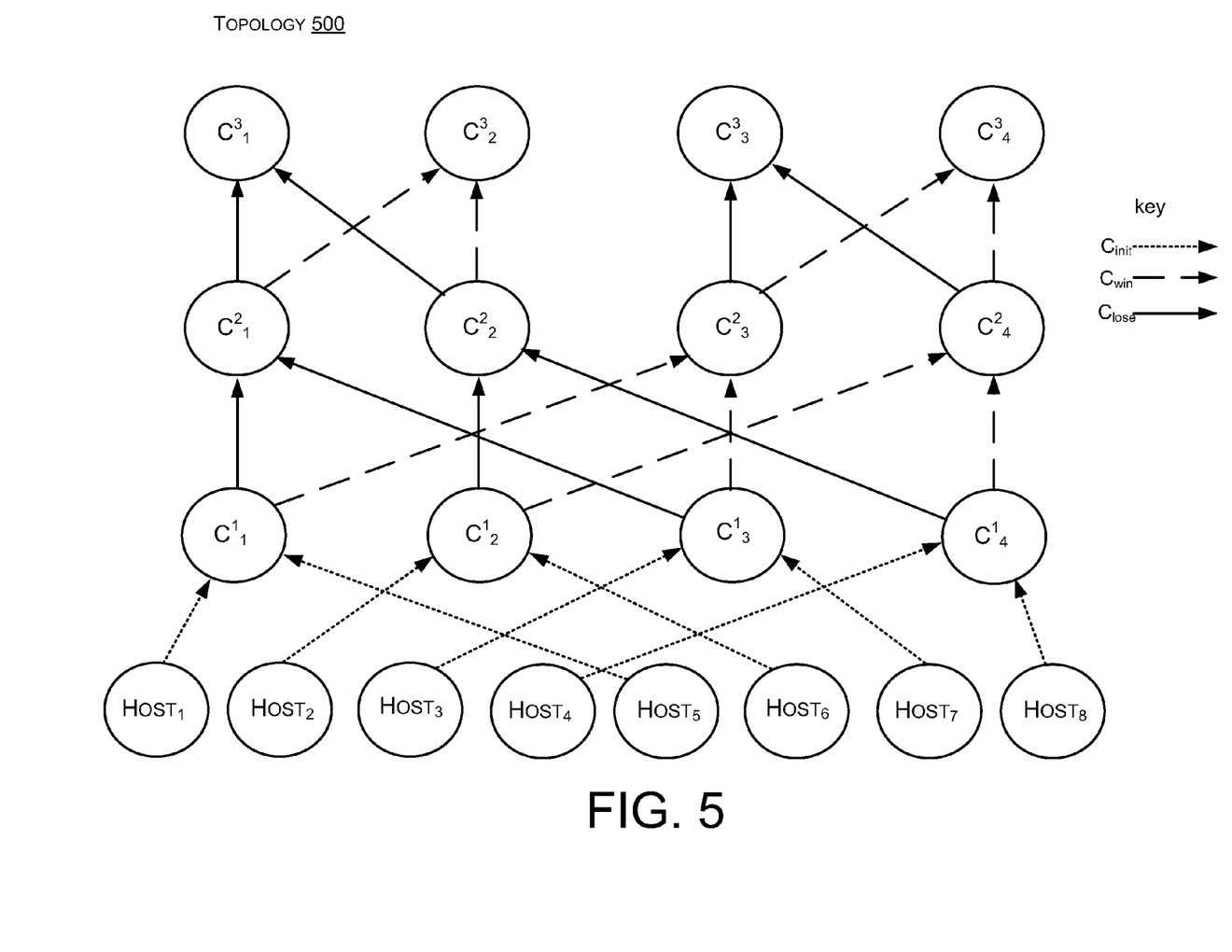

Again, the crux is the initialization, which sets values for $c_{init}$, $c_{win}$, and $c_{lose}$, according to Algorithm 8. FIG. 5 illustrates the resulting topology 600 for n=8.

---

Algorithm 6 Distributed tightening collaborative speed determination mechanisms-Host

---

Input: Initial coordinator $c_{init}$ for the host
Output: None; host accumulates data as a side effect
    1: Set $c := c_{init}$
    2: while $c \neq \perp$ do
    3:  Ask coordinator c for instructions
    4:  Receive h', $c_{win}$, and close from c
    5:  Perform probes to/from host h'

---

-continued

---

Algorithm 6 Distributed tightening collaborative speed determination mechanisms-Host

---

6:  if current host wins round then
    7:    $c := c_{win}$
    8:  else
    9:    $c := c_{lose}$
    10: end if
    11: end while

---

Algorithm 7 Distributed tightening collaborative speed determination mechanisms-Coordinator

---

Input: Parent coordinators $c_{win}$ and $c_{lose}$
Output: None
    1: Wait for messages from any two hosts, $h_i$ and $h_j$
    2: Send ($h_j$, $c_{win}$, $c_{lose}$) to $h_i$
    3: Send ($h_i$, $c_{win}$, $c_{lose}$) to $h_j$
    4: stop

---

Algorithm 8 Distributed tightening collaborative speed determination mechanisms-Initialization

---

Input: Set of n hosts $\{h_i \mid i \in [i..n]\}$
    Count k of rounds to run
    Set of $n/2 * k$ coordinators $\{c^r_i \mid r \in [1 \ldots k], i \in [1 \ldots n/2]\}$
Output: Assignment of $c_{init}$ for each host
    Assignment of $c_{win}$ and $c_{lose}$ for each coordinator
    1: for all $i \in [1..n/2]$ do
    2:  Set $j := i + n/2$
    3:  Set $h_i \cdot c_{init} := c^1_i$
    4:  Set $h_j \cdot c_{init} := c^1_i$
    5: end for
    6: for all $r \in [2 \ldots k]$ do
    7:  for all $x \in [0..2^{r-2}]$ do
    8:    for all $y \in [0 \ldots n/2^r]$ do
    9:      for all $z \in [0 \ldots 1]$ do
    10:       Set $i := n/2^{r-1} x + y + 1$
    11:       Set $s := n/2^r$
    12:       Set $c_{i+sz}^{r-1} \cdot c_{win} := c^r_i$
    13:       Set $c_{i+sz}^{r-1} \cdot c_{lose} := c^r_{i+s}$
    14:      end for
    15:    end for
    16:  end for
    17: end for
    18: Set $c^k_i \cdot c_{next} := \perp$

---

As in the case without tightening, the distributed algorithm results in the same set of probes as the centralized algorithm.

In the absence of tightening, there are strictly fewer coordinators than hosts. This is not the case for the inline-tightening algorithm, so it would be prudent to avoid assigning any given host to multiple coordination roles that demand simultaneous effort. Since each coordinator functions for only one round, this is easily achieved:

$$\forall r \in [1 \ldots k], i \in [1 \ldots n/2], j(r \bmod 2)n/2+i: c^r_i = h_j$$

In summary, collaborative speed determination mechanisms are described for efficiently measuring upload bandwidth for peer-to-peer systems, based on bandwidth tournaments. In some implementations, each host can be paired with a succession of other hosts for performing mutual bandwidth probes. This tool emergently locates other hosts with sufficient download bandwidth to enable the accurate determination of the host's upload bandwidth. Collaborative speed determination mechanisms can deal with errors in underlying probes, aggregating results from multiple probes without incorporating erroneously low measurements.

Collaborative speed determination mechanisms were evaluated using simulations on empirical and analytical distributions of host bandwidth. The simulations were validated on PlanetLab. The evaluation confirms that collaborative speed determination mechanisms can efficiently estimate host's upload bandwidth, even in the presence of significant measurement error.

Second Example of Collaborative Speed Determination Mechanisms

Pairwise bandwidth probes between a pair of hosts are discussed above in great detail. Other implementations can generalize the application of these concepts to more than two hosts. For instance, in one such case a set of k hosts $h_1, \ldots, h_k$ (k=2, 3, ...) can form a cycle such that $h_1$ transmits data to $h_2$ at full speed, $h_2$ transmits data to $h_3$ at full speed, etc. In a general sense $h_i$ transmits data to $h_{\{i+1\}}$ at full speed, where i=1, ..., k−1. Finally, the cycle is closed by $h_k$ transmitting to $h_1$ at full speed. Because each host is involved in only one upload and one download transmission, all these transmissions can be done in parallel. As a result of these measurements, each host $h_i$ (i=1 ... k) knows the minimum of its own download speed and the upload speed of its predecessor in the cycle. From a formal perspective, for all i=2 ... k that host $h_i$ measures the following value:

$$P(h_{\{i-1\}} \to h_{\{i\}}) = \min\{d_{\{i\}}, u_{\{i-1\}}\}.$$

Similarly, for host $h_1$, it holds that:

$$P(h_{\{k\}} \to h_{\{0\}}) = \min\{d_{\{0\}}, u_{\{k\}}\}.$$

By combining all these measurements P( ), the hosts can collaboratively determine the host with minimum upload speed among all hosts $h_1, \ldots, h_k$. In particular, if the value of $P(h_{\{i-1\}} \to h_{\{i\}})$ (or alternatively, $P(h_{\{k\}} \to h_{\{0\}})$) is less than any other measured value of P( ), then it holds that host $h_{\{i-1\}}$ (or alternatively, $h_k$) has the smallest upload bandwidth among all hosts.

Unlike in the case of pairwise bandwidth probes, a node may not be able to determine whether its own measurement is the smallest measurement locally, i.e., based only on its own measurement. In order to compare the different measurements P( ), hosts may exchange their measurement results using any form of communication protocol. Alternatively, hosts may send their measured results to some centralized entity that is responsible for determining the minimum measured value and informs the hosts of its findings.

Third Example of Collaborative Speed Determination Mechanisms

Note that if one host has a download speed that is known to be relatively high, and if other hosts have upload speeds that are known to be relatively low, then it may be possible to eliminate a probe from the high-download host to any of the low-upload hosts. In particular, the low-upload hosts may be able to use the high-download host to determine their upload speeds by performing a single probe to it.

However, if the aggregate upload speed of the other hosts exceeds the download speed of the one host, it can be advantageous to coordinate the probes so that they do not all occur at the same time. If they were allowed to all occur at the same time, the measured speed from some of the low-upload hosts to the high-download host might be limited by the congested download channel to the host they are probing. In such a case, the low-upload hosts might measure upload speeds that are less than the correct values for their upload speeds.

Previous technologies supply a single high-download host that can be used in the measurement of upload speed for low-upload hosts, but the need for coordination has not been appreciated. The scheduling aspect of the present concepts provides for such coordination. The coordination can allow low-upload hosts to measure their upload speeds without incurring errors due to excessive congestion at the download channel to the host they are probing.

Note that, when employed in this manner, these implementations may not determine the upload speed of the high-download host. However, there are applications in which this is acceptable, just as it is often acceptable not to determine the precise upload speed of the host with the highest upload speed.

Example of a System Configuration

Figure 6:
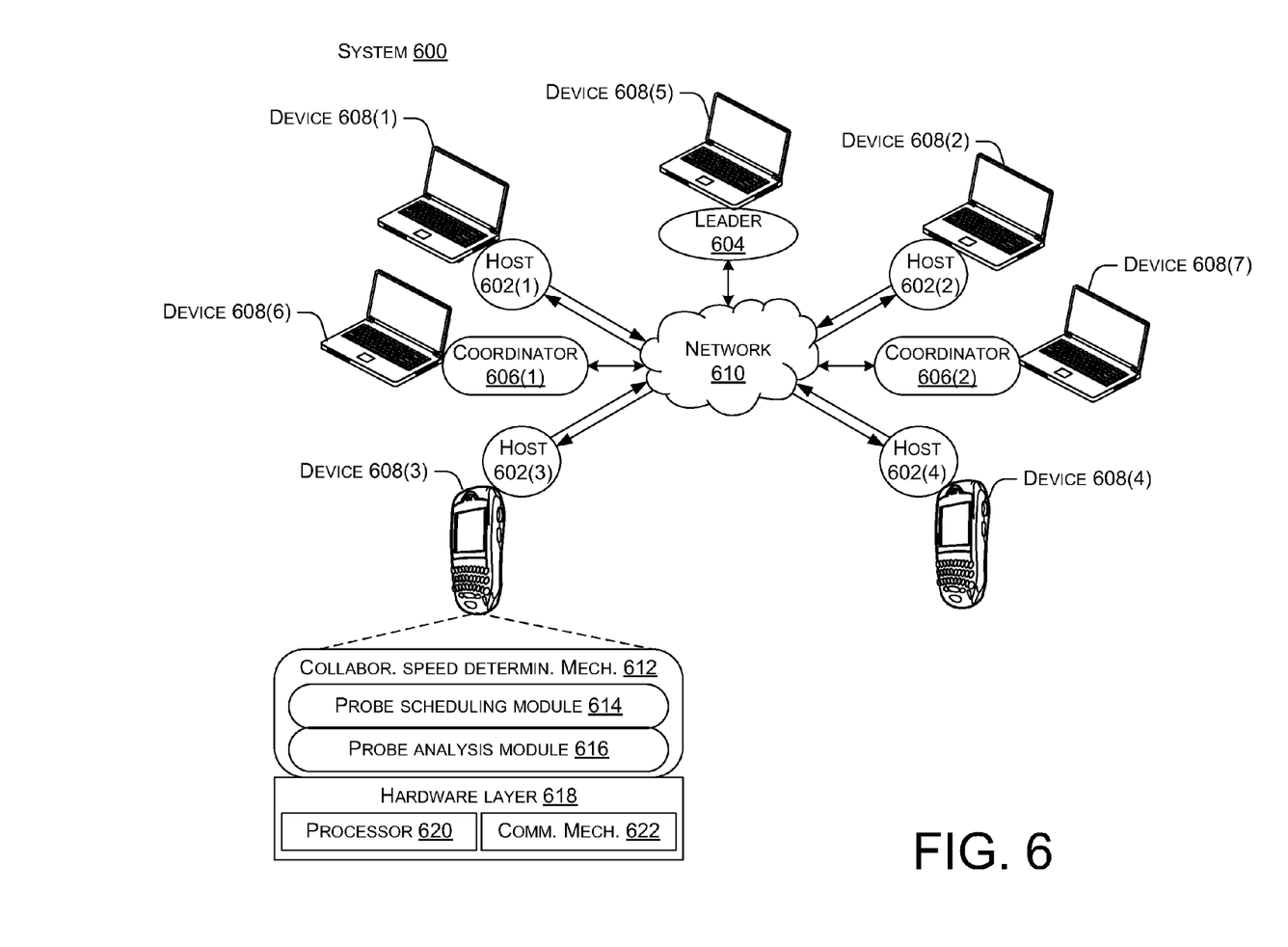
FIG. 6 shows an example of a system upon which collaborative speed determination can be accomplished in accordance with some implementations of the present concepts.

FIG. 6 shows a system 600 upon which collaborative determination concepts can be employed. For discussion purposes, system 600 includes four hosts 602(1), 602(2), 602(3), and 602(4) a leader 604 and two coordinators 606(1) and 606(2). Individual hosts, leaders and coordinators are manifest on devices 608. Specifically, host 602(1) occurs on device 608(1), host 602(2) occurs on device 608(2), host 602(3) occurs on device 608(3), and host 602(4) occurs on device 608(4). Leader 604 occurs on device 608(5) and coordinators 606(1) and 606(2) occur on devices 608(6) and 608(7), respectively. The devices 608 are communicably coupled to a network 610.

Devices 608 can be any type of device that can communicate data over network 610. Illustrated devices are manifest as notebook computers and smart phones. These illustrated devices are intended to be representative of any type of device that can communicate data over network 610 and can include, personal digital assistants, gaming devices, servers, or any of a myriad of ever evolving types of devices.

Device 608(3) is illustrated as including a collaborative speed determination mechanism 612 that includes a probe scheduling module 614 and a probe analysis module 616. The collaborative speed determination mechanism 612 can operate upon a hardware layer 618. The hardware layer can include a processor 620 and a communication mechanism 622 for uploading and downloading data from network 610. For sake of brevity, collaborative speed determination mechanism 612, probe scheduling module 614, probe analysis module 616, hardware layer 618, processor 620 and communication mechanism 622 are only illustrated and described relative to device 608(3). Some or all of these components (612-622) can also occur on any of devices 608(1), 608(2) and/or 608(4)-608(7).

Leader 604 is configured to communicate instructions to individual hosts regarding which other host(s) to send bandwidth probes. In one configuration, leader 604 can initialize hosts 602(1)-602(4) such that each host is initialized with the identity of a coordinator (in the illustrated case, either coordinator 606(1) or 606(2). For instance, hosts 602(1) and 602(3) could be initialized to coordinator 606(1) and hosts 602(2) and 602(4) could be initialized to coordinator 606(2). In such a case, the coordinator can communicate host identities to one another to set-up exchange of bandwidth probes. For instance, coordinator 606(1) can provide the identity of host 602(1) to host 602(3) and vice-versa. The hosts 602(1) and 602(3) can then exchange bandwidth probes. Similarly, coordinator 606(2) can provide the identity of host 602(2) to host 602(4) and vice-versa.

In this configuration, the collaborative speed determination mechanism 612 includes probe scheduling module 614 and probe analysis module 616. It should become apparent from the description below that these modules can be utilized to achieve the leader functionality described above.

As the name implies, probe scheduling module 614 can coordinate bandwidth probes. For instance, the probe scheduling module can coordinate sending a first bandwidth probe from a first host to the second host and a second bandwidth probe from the second host to the first host. In another configuration, the probe scheduling module can schedule individual hosts to probe a relatively high bandwidth host in a manner that avoids exceeding the capacity of the high bandwidth host.

Probe analysis module 616 is configured to compare speeds of the first and second bandwidth probes that the probe scheduling module causes to be sent. For instance, the probe analysis module can designate one of the first and second hosts that sent the individual bandwidth probe that results in a lower speed as a loser. Conversely, the probe analysis module can designate the other of the first and second hosts that sent the other individual bandwidth probe that results in a higher speed as a winner. Further, the probe analysis module 616 can take the speed of the loser as a first estimate of upload speed for the loser. Information regarding the winners and/or losers can be conveyed to the probe scheduling module 614 that can then coordinate or schedule subsequent bandwidth probes. This process can be repeated (i.e., bandwidth tournaments) until the download speed of all or nearly all of the hosts has been estimated.

For ease of explanation, the leader 604 and coordinators 606(1)-606(2) are shown as separate and distinct entities. In other configurations, a single entity may perform both functions. For instance, a device may provide both a leader function and a coordinator function. Further, and again for ease of explanation, the leader 604 and coordinators 606(1) and 606(2) are shown separate and distinct from the hosts. However, in other implementations one or more hosts may provide the leader and/or coordinator functions.

Further still, rather than occurring on the hosts 602(1)-602(4) that are involved in the bandwidth probes, the collaborative speed determination mechanism 612 may occur on a device that is not associated with a host. For instance, the collaborative speed determination mechanism can be performed by leader 604 on device 608(5).

First Method Example

Figure 7:
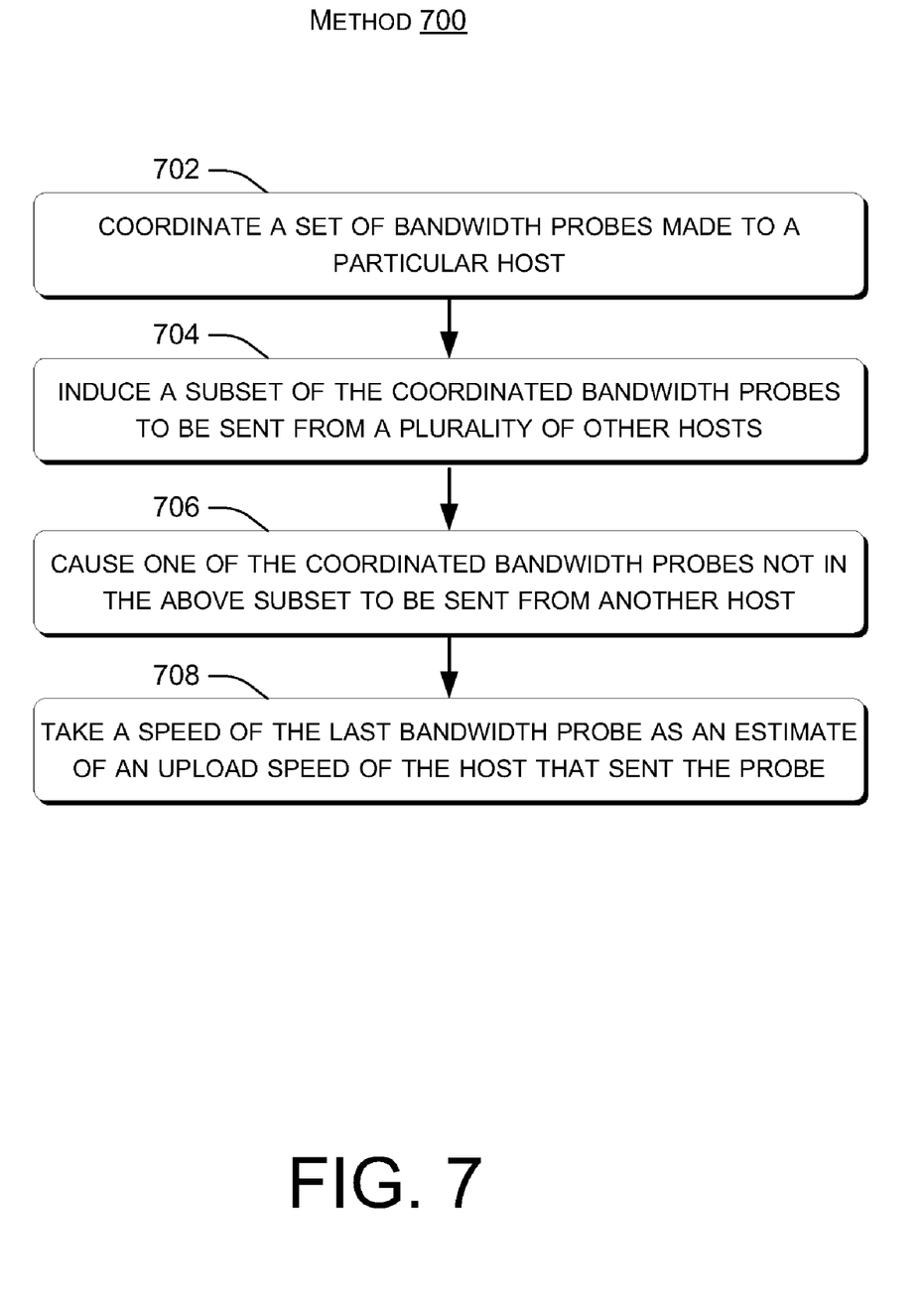
FIGS. 7-8 are examples of flowcharts of collaborative speed determination methods in accordance with some implementations of the present concepts.

FIG. 7 illustrates a flowchart of a method or technique 700 that is consistent with at least some implementations of the present concepts. The order in which the method 700 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 702, the method coordinates a set of bandwidth probes made to a particular host. This coordination could take various forms, so as to influence the order and relative timing of the probes, as described in the following.

At block 704, the method induces a subset of the coordinated bandwidth probes to be sent from a plurality of other hosts.

At block 706, the method causes one of the coordinated bandwidth probes not in the above subset to be sent from another host. In accordance with the coordination, this bandwidth probe occurs after the occurrences of the subset of the coordinated bandwidth probes sent by other hosts.

At block 708, the method takes a speed of the first bandwidth probe as an estimate of an upload speed of the second host. Subsequent probes can be scheduled based upon the records of the first and second hosts to further refine the estimate of their respective upload speeds.

Depending on the implementation, the coordination step may include various checks for determining that the bandwidth probe of block 706 should be performed after the bandwidth probes of block 704. For example, the implementation may first ascertain that the sum of the maximum possible upload speeds of all probing hosts exceeds the minimum possible download speed of the probed host. For another example, the implementation may first ascertain that the probing host identified in block 706 has not been a loser of a prior bandwidth probe.

Second Method Example

Figure 8:
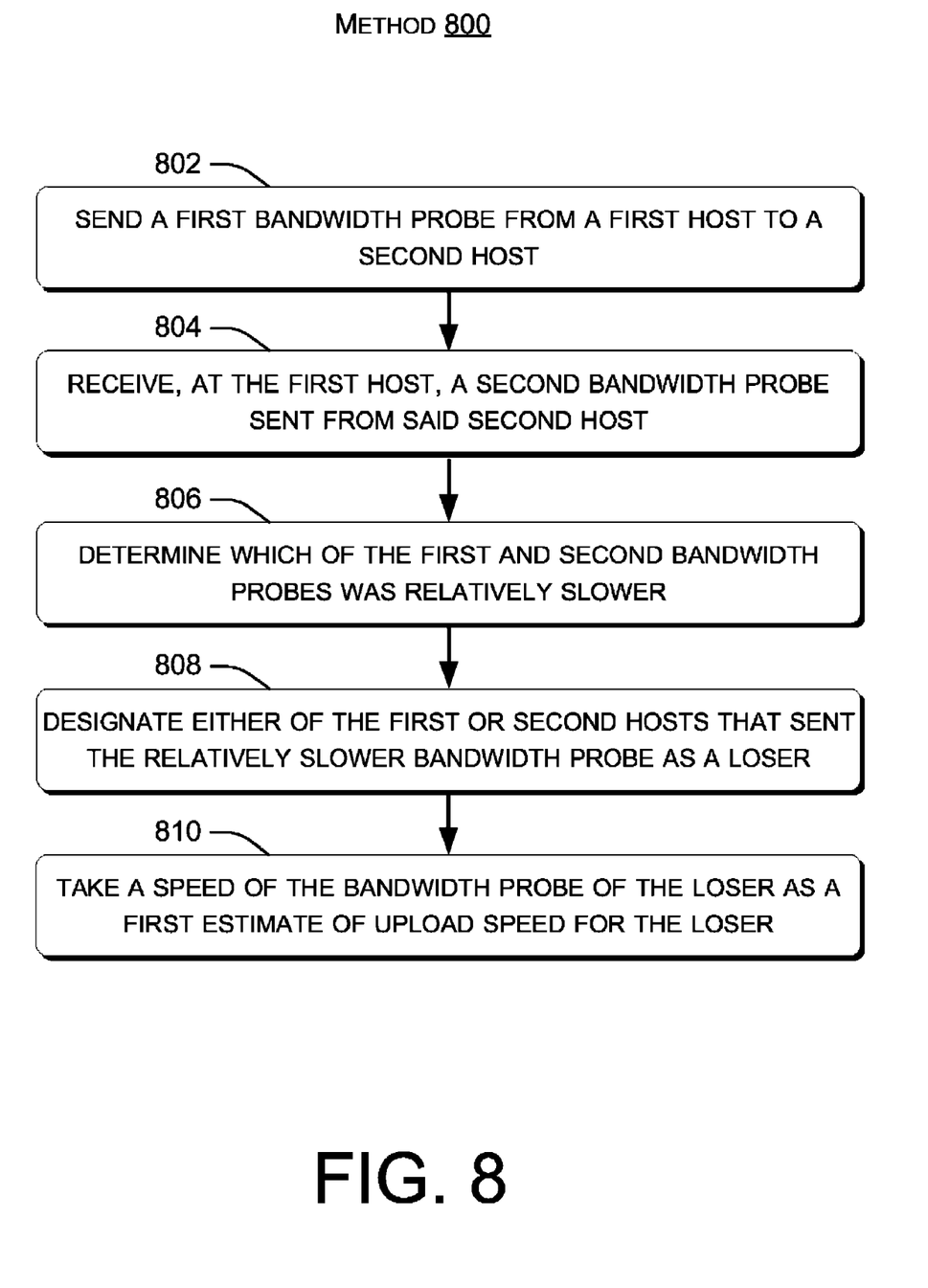

FIG. 8 illustrates a flowchart of a method or technique 800 that is consistent with at least some implementations of the present concepts. The order in which the method 800 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 802, the method sends a first bandwidth probe from a first host to a second host. At block 804, the method receives, at the first host, a second bandwidth probe sent from the second host. In some instances, one or both of the first and second hosts can cause the first and second bandwidth probes to be sent. In other cases, other entities, such as a coordinator can cause the first and second bandwidth probes to be sent. In some cases, blocks 802 and 804 can be performed responsively to ascertaining that the first and second hosts have or have not each been losers of at least one prior bandwidth probe.

At block 806, the method determines which of the first and second bandwidth probes was relatively slower. Various techniques can be utilized for estimating the speeds of the two bandwidth probes. Once the speed of the two bandwidth probes is estimated, the speeds can be compared to determine which one was slower.

At block 808, the method designates either of the first or second hosts that sent the relatively slower bandwidth probe as a loser.

At block 810, the method takes a speed of the bandwidth probe of the loser as a first estimate of upload speed for the loser. Subsequent estimates may be performed to verify or otherwise increase the accuracy of the first estimate. For instance, the first estimate of upload speed can be compared to a second estimate. In some cases, the second estimate can be accepted where the second estimate exceeds the first estimate by a designated minimum amount.

In summary, the collaborative speed determination mechanisms can measure upload bandwidths in ad-hoc peer-to-peer environments. The collaborative speed determination mechanisms can organize bandwidth probes between pairs of hosts in a bandwidth tournament. Each host in the tournament can be successively paired with other hosts until it is matched with a strong enough partner to reveal the host's upload bandwidth. The collaborative speed determination mechanisms can work despite measurement errors that corrupt its tournament schedule. For instance, results from multiple probes can be aggregated using a technique that averages out measurement error without incorporating erroneously low measurements. For scalability, the coordination of probes can be distributed among the hosts. Collaborative speed determination mechanisms can efficiently yield upload bandwidth estimates that are robust to erroneous bandwidth probes.

Conclusion

Although techniques, methods, devices, systems, etc., pertaining to collaborative determination scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method for estimating upload speeds of a plurality of hosts, the method comprising:
    sending a first bandwidth probe from a first host of the plurality of hosts to a second host of the plurality of hosts;
    receiving, at the first host, a second bandwidth probe sent from said second host;
    determining which of the first and second bandwidth probes was relatively slower;
    in a first instance when the first bandwidth probe was relatively slower than the second bandwidth probe, taking a speed of the first bandwidth probe as a first estimate of upload speed for the first host; and
    in a second instance when the first bandwidth probe was relatively faster than the second bandwidth probe:
        repeatedly exchanging, by the first host, one or more additional bandwidth probes with one or more additional hosts of the plurality of hosts until an individual one of the additional bandwidth probes sent from the first host to an individual one of the additional hosts is determined by the first host to be relatively slower than a corresponding one of the additional bandwidth probes received from the individual additional host, and
        taking a speed of the individual additional bandwidth probe sent from the first host that was determined to be relatively slower than the corresponding one of the additional bandwidth probes received from the individual additional host as the first estimate of upload speed for the first host.

2. The method of claim 1, further comprising:
    ascertaining that said first host has not been a loser of a prior bandwidth probe exchange;
    establishing that said second host has not been a loser of a prior bandwidth probe exchange; and,
    arranging for said first host and said second host to exchange the first and the second bandwidth probes.

3. The method of claim 2, wherein the arranging comprises:
    contacting a first coordinator in an instance when said first host wins a first individual bandwidth probe exchange;
    contacting said first coordinator in an instance when said second host wins a second individual bandwidth probe exchange;
    communicating an identity of said first host to said second host; and,
    communicating an identity of said second host to said first host.

4. The method of claim 1, further comprising:
    ascertaining that said first host has been a loser of a first prior bandwidth probe exchange;
    establishing that said second host has been a loser of a second prior bandwidth probe exchange; and,
    arranging for said first host and said second host to exchange the first and the second bandwidth probes.

5. The method of claim 4, wherein the first bandwidth probe and the second bandwidth probe are sent contemporaneously with bandwidth probes of individual hosts that have not been losers of prior bandwidth probe exchanges.

6. The method of claim 4, wherein the arranging comprises:
    contacting a coordinator responsive to the first host losing the first prior bandwidth probe exchange;
    contacting the coordinator responsive to the second host losing the second prior bandwidth probe exchange;
    communicating an identity of said first host to said second host; and,
    communicating an identity of said second host to said first host.

7. The method of claim 1, further comprising:
    comparing said first estimate of upload speed to a second estimate of upload speed for the first host; and,
    accepting said second estimate of upload speed in an instance where said second estimate exceeds said first estimate by a designated minimum amount.

8. The method of claim 1, further comprising:
    computing a maximum value over all estimates of upload speed for an individual host;
    computing a lower bound as a product of said maximum value and a designated multiplier;
    including estimates for said individual host that are at least equal to said lower bound; and,
    computing an average over the included estimates for said individual host.

9. One or more computer-readable storage devices comprising instructions which, when executed by one or more computing devices, cause the one or more computing devices to perform:
    sending a first bandwidth probe of a first host to a second host of a plurality of hosts;
    receiving, at the first host, a second bandwidth probe sent from said second host;
    determining which of the first and second bandwidth probes was relatively slower;
    designating either of the first or second hosts that sent the relatively slower bandwidth probe as a loser;
    designating the other of the first or second hosts that did not send the relatively slower bandwidth probe as a winner;
    taking a speed of the relatively slower bandwidth probe as a first estimate of upload speed for the loser; and
    exchanging additional bandwidth probes between the winner and a third host of the plurality of hosts to estimate the upload speed of the winner or the third host,
    wherein in exchanging the additional bandwidth probes, an additional winner and an additional loser is designated, and the speed of a relatively slower additional bandwidth probe that was sent by the additional loser is taken as an estimate of upload speed of the additional loser.

10. The one or more computer-readable storage devices according to claim 9, further comprising instructions which, when executed by the one or more computing devices, perform:
    refining the first estimate of upload speed for the loser.

11. The one or more computer-readable storage devices according to claim 10, wherein the first estimate is refined by sending further bandwidth probes from the loser to other hosts of the plurality of hosts.

12. A system comprising:
a speed determining mechanism configured to:
cause a first host of a plurality of hosts to send a first bandwidth probe to a second host of the plurality of hosts;
cause the first host to receive a second bandwidth probe sent from said second host;
determine which of the first and second bandwidth probes was relatively slower;
in a first instance when the first bandwidth probe was relatively slower than the second bandwidth probe, take a speed of the first bandwidth probe as a first estimate of upload speed of the first host;
in a second instance when the first bandwidth probe was relatively faster than the second bandwidth probe
cause the first host to repeatedly exchange one or more additional bandwidth probes with one or more additional hosts from the plurality of hosts until an individual one of the additional bandwidth probes sent from the first host to an individual one of the additional hosts is determined to be relatively slower than a corresponding one of the additional bandwidth probes received from the individual additional host, and
take a speed of the individual additional bandwidth probe sent from the first host that was determined to be relatively slower than the corresponding one of the additional bandwidth probes received from the individual additional host as the first estimate of upload speed for the first host; and
one or more processors configured to execute the speed determining mechanism.

13. The system according to claim 12, embodied on the first host.

14. The system according to claim 12, wherein the speed determining mechanism is further configured to refine the first estimate of the upload speed of the first host.

15. The system according to claim 12, wherein the speed determining mechanism is located on a third host from the plurality of hosts that coordinates the first bandwidth probe and the second bandwidth probe.

16. The system according to claim 15, wherein the speed determining mechanism is further configured to identify the second host to the first host.

17. The system according to claim 15, wherein the speed determining mechanism is further configured to coordinate the additional bandwidth probes.

18. The system according to claim 12, distributed across at least two of the plurality of hosts.

19. The system according to claim 12, further comprising the first host.

20. The system according to claim 19, further comprising the second host.

* * * * *